United States Patent [19]

Chung

[11] Patent Number: 5,783,812
[45] Date of Patent: Jul. 21, 1998

[54] LINEAR CCD HAND HELD BAR CODE READER WITH VIBRATOR

[75] Inventor: Huang I. Chung, Taipei, Taiwan

[73] Assignee: Sun Top Computer Systems Corp., Taipei, Taiwan

[21] Appl. No.: 649,257

[22] Filed: May 14, 1996

[51] Int. Cl.⁶ .................................................. G06K 7/10
[52] U.S. Cl. .................................. 235/472; 235/462
[58] Field of Search .............................. 235/472, 462, 235/454, 461, 467, 476

[56] References Cited

U.S. PATENT DOCUMENTS

| | | | |
|---|---|---|---|
| 5,221,838 | 6/1993 | Gutman et al. | 235/472 X |
| 5,536,926 | 7/1996 | Ikeda et al. | 235/472 X |
| 5,536,930 | 7/1996 | Barkan et al. | 235/472 |
| 5,543,610 | 8/1996 | Bard et al. | 235/472 X |
| 5,559,319 | 9/1996 | Peng | 235/462 |
| 5,614,706 | 3/1997 | Bard et al. | 235/472 |

FOREIGN PATENT DOCUMENTS 04-100185  4/1992  Japan .

*Primary Examiner*—Donald T. Hajec
*Assistant Examiner*—Michael G. Lee
*Attorney, Agent, or Firm*—Donald C. Casey

[57] ABSTRACT

A linear CCD hand held bar code reader which includes a vibrator to provide a vibration signal when the reader completes a reading of a bar code is described. A sensor is provided having a metal antenna mounted around the area to be held by the operator and the capacitance of the operator is used to trigger a sensor when the operator holds the reader, thus causing the sensor to turn on the reader. A reflector is mounted and shifted between two reflecting positions to reflect an image of a bar code at different scanning lines when the bar code is stained with dirt or blurred. The reflector can be shifted either by a drive mechanism, or by a magnet combination.

3 Claims, 6 Drawing Sheets

LINEAR CCD HAND HELD BAR CODE READER WITH VIBRATOR

BACKGROUND OF THE INVENTION

The present invention relates to a bar code reader of the linear CCD type, which comprises (A) a vibrator controlled by the reader to be vibrated when the reader completes the reading of a bar code; (B) a drive mechanism controlled by the reader to change the reflecting angle of a reflector when an error reading occurs; and (c) a sensor activated while the reader is held by the operator.

Each regular consumer commodity commonly has its own bar code so that the information of such commodity can be easily and quickly recognized by scanning with a reader. FIG. 1 shows a prior art reader for this purpose. As illustrated, the reader includes a housing, an ON/OFF switch, a linear CCD mounted inside the housing, a buzzer, and a Led indicator. The buzzer will "beep" and the LED indicator will light when the reader completes reading of a bar code. However, when operating the reader, an operator may be unable to positively recognize the audio signal of the buzzer and the visual signal of the LED indicator due to surrounding noise and light. Thus, an error may occur. Another drawback of this reader is that the ON/OFF switch may be damaged because it must be repeatedly switch on to read a bar code and off after reading a code. Furthermore, if the bar code is stained with dirt or blurred due to bad printing, a reading error also may occur. Since, however, the reflector of a traditional reader is not adjustable, the operator has to move the aperture of the reader over a bar code when a reading error occurs.

SUMMARY OF THE INVENTION

The present inventions have been accomplished as described below to provide a reader which eliminates the aforesaid drawbacks.

(1) The reader of this invention comprises a vibrator activated by the reader itself when the reader completes reading of a bar code. This additional indication, besides buzzer and LED indicator, will minimize the chance of error due to surrounding noise and light.

(2) A driving mechanism is also installed in the housing the reader, controlled by the reader itself to change the reflecting angle of the reflector when an error reading occurs. This will allow the operator to scan a stained or blurred code without moving the aperture of the reader over a bar code and still read the bar code correctly. There will be two alternatives to describe such an embodiment of present invention.

(2.1) The driving mechanism comprises a movable board secured to the reflector and turned about a pivot inside the housing to stop the movable board and said reflector in a first reflecting position. A magnet is mounted on the movable board at one side opposing the reflector, and an electromagnet is mounted inside the housing facing the magnet. The electromagnet and the magnet attract each other when the electromagnet is deactivated, causing the movable board and the reflector to be retained in a first reflecting position; the electromagnet will repel the magnet when energized, which causes the movable board and the reflector to move to a baffle board at a second reflecting position;

(2.2) The driving mechanism comprises a cam, a motor which controls the cam, a movable board having one side at a tangent to the cam and another side secured to the reflector. One end of the movable board turns about a pivot and an opposite end is suspended from a spring inside the housing. The motor is driven to turn the cam through a predetermined angle when a no read occurs, causing the cam to force the movable board and the reflector away from a first reflecting position and to a second reflecting position.

(3) A sensor is installed in the housing of the reader having metal antenna attached to the inner wall of the housing surrounding the handle of the reader. The sensor is induced by operator's hand when holding reader, and therefore, triggers the reader into functioning. This will give the operator immediate access to reading a bar code without using the ON/OFF switch in order to minimize the damage of the switch, and save the power consumption of the system.

DETAILED DESCRIPTION OF THE PREFERRED EMBODIMENT

Figure 2:
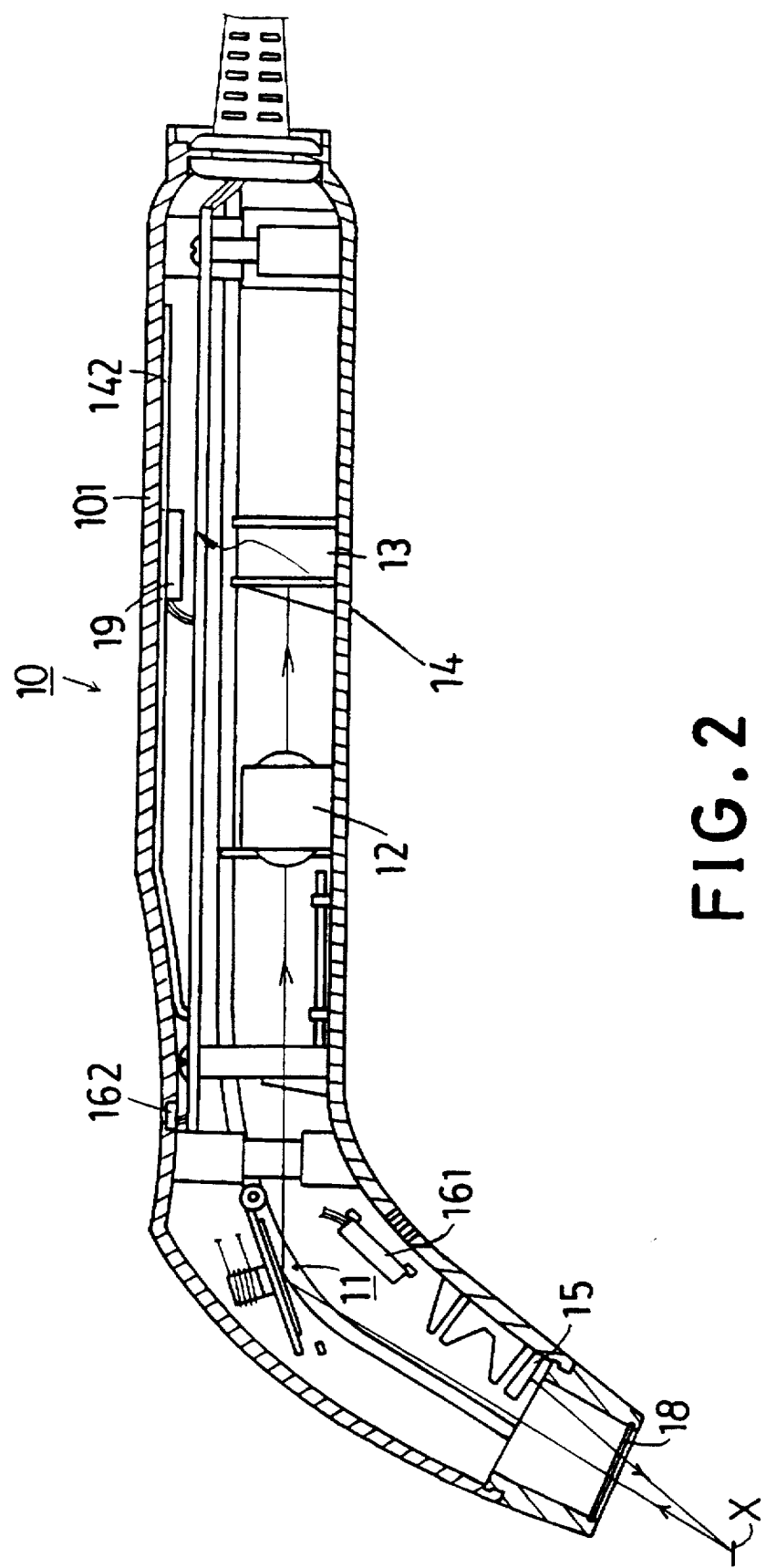
FIG. 2 is a sectional view of a linear CCD type bar code reader according to the present invention.

Referring to FIG. 2, the reader 10 includes a vibrator, 19. When the reader reads a bar code, X, the vibrator is immediately triggered to vibrate, thereby indicating the completion of a positive reading. Therefore, an operator need not pay attention to either a buzzer, 161, or LED indicator, 162. The reader has a metal antenna, 142, mounted surrounding the inner housing of the holder, 101. When the operator holds the holder, the metal antenna is induced to turn on the CPU and the reflector, 11, to read a bar code correctly.

Figure 1:
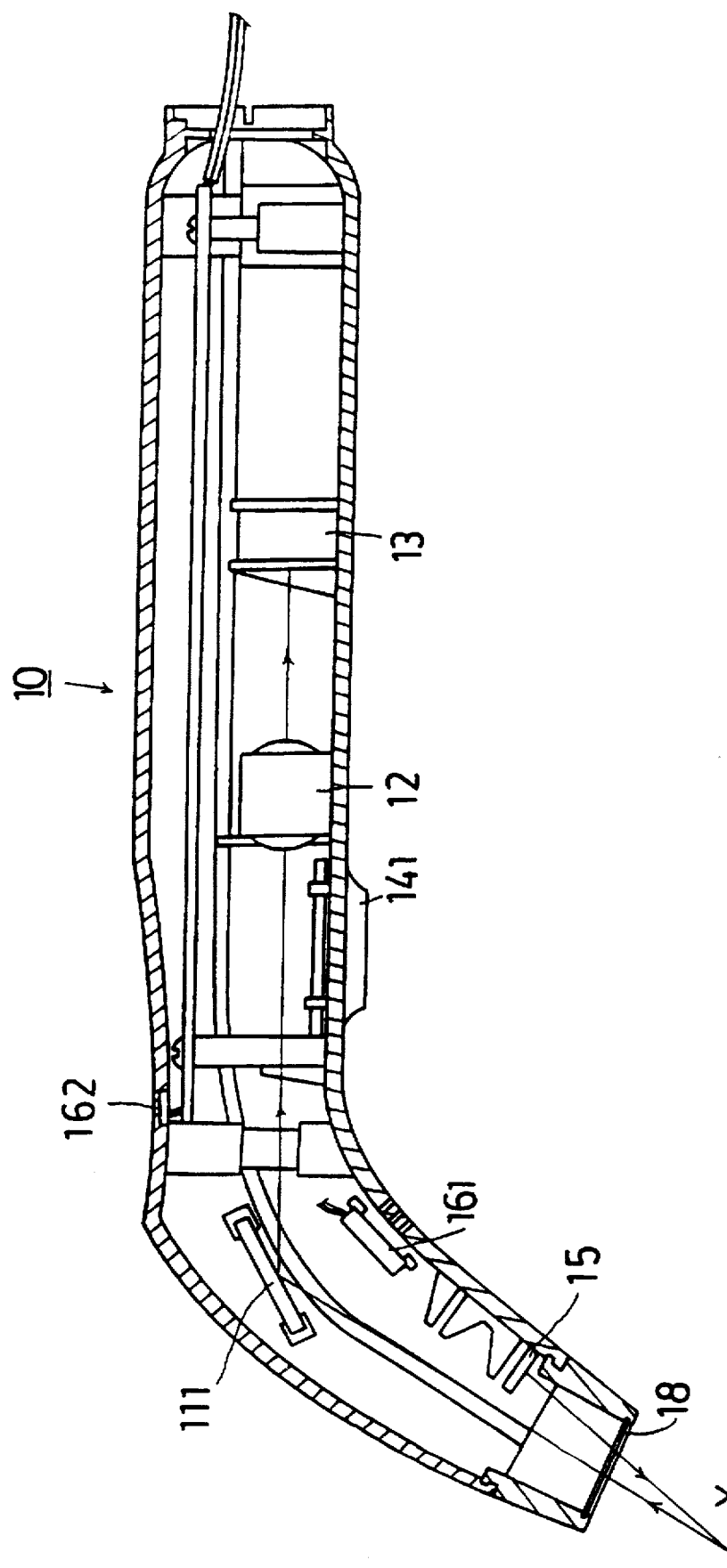
FIG. 1 is a sectional view of a linear CCD type bar code reader according to the prior art.
Figure 3:
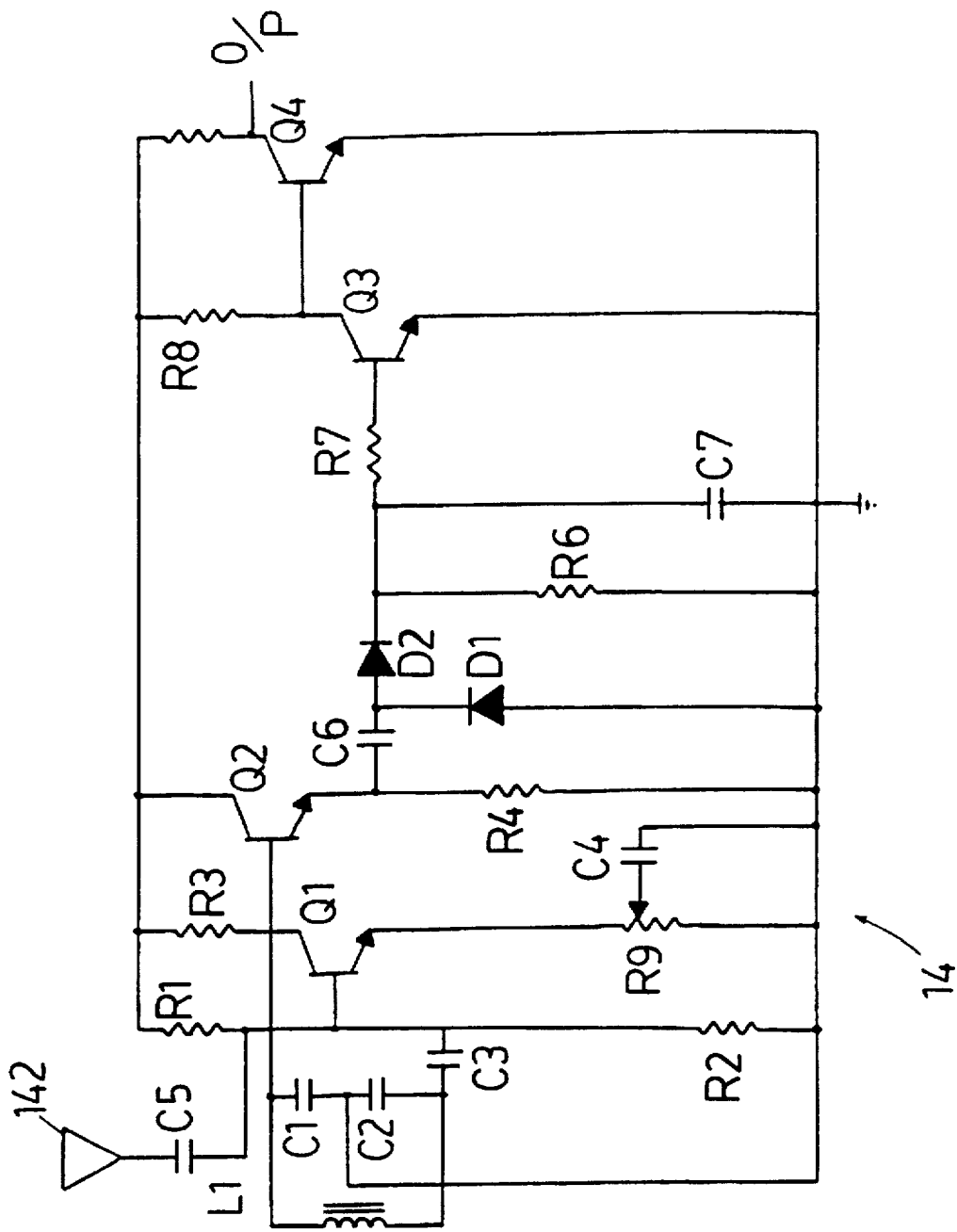
FIG. 3 is a circuit diagram of the sensor and the antenna according to the present invention.

Referring to FIG. 3 and FIG. 1, when the operator holds the housing 101 of the reader in hand, the capacitance of the antenna 142 of the sensor which is mounted on the PCB, 14, to ground is increased. The modulated circuit has sufficient resistance to prevent gain in the circuit and to keep the gain in the circuit bellow a critical level. In this instance, the vibrator 19 does not work and an ON signal is sent to the CPU, the reflector 11, and the light source, 15, causing them to work. The sensor 14 is a Colpitts oscillator of 300MHz frequency. The antenna 142 is a part of the modulated circuit, coupled to the base of transistor Q1 by capacitor C5. The gain in the circuit can be adjusted by a variable resistor R9. The output of Colpitts oscillator is buffered by transistor Q2, and rectified by diodes D1 and D2 into a positive bias voltage which is then sent to the base of transistor Q3. When Q3 does not work, transistor Q4 is off, and therefore a H (OFF) signal is outputted. When the housing 101 of a reader is touched by hand, the antenna is induced, and transistor Q1 is off, thus Q3 is off too. At this stage, transistor Q4 is driven by the positive bias voltage of resistor R8 to change its output from H(OFF) to L(ON) which causes the CPU, the reflector 11, and the light source 15 to be turned on.

Figure 4A:
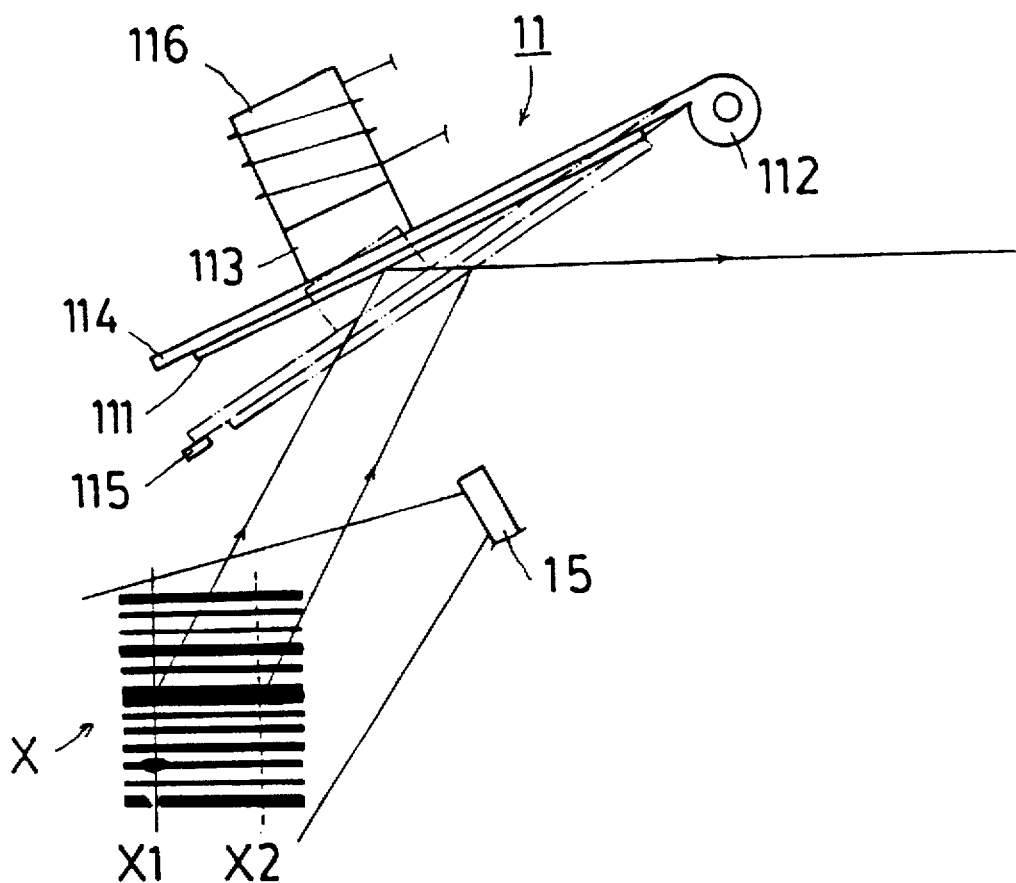
FIGS. 4A and 4B show the hardwired arrangement and its circuit of the reflector driving mechanism according to the present invention.
Figure 4B:
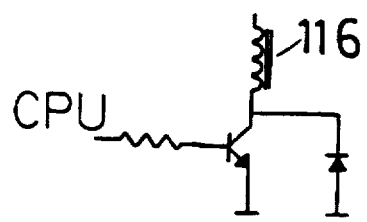

As illustrated in FIG. 4A and 4B, when a bar code, X, is stained by dirt or blurred due to bad printing, the CCD array 3, will be unable to recognize the code X, and a reading error will occur. When an error occurs, the reflector, 111, will be turned to a certain angle by a reflector driving mechanism to reflect the image of the bar code X at a different scanning line. The turning of reflector 111 is controlled by the CCD array 13 of the reader. The reflector 111 is mounted on the bottom side o a movable board, 114, which is turned about a pivot, referenced as 112 above a baffle board, 115. The baffle board 115 limits the turning angle of the movable board 114. An electromagnet, 116, is disposed above the magnet, 113. When the electromagnet 116 does not work it will be attracted by the magnet 113. The reflector 111 is then moved with the movable board 114 towards the electromagnet 116, causing the reflector 111 to reflect the image of the bard code X at scanning line X1 If scanning line X1 is unreadable, stained or blurred, the reader gives an instruction to energize the electromagnet 116 causing it to repel the magnet 113. The moveable board114 is then forced downward to the baffle board 115 to change the angular position of the reflector 111 relative to the bar code X, enabling the reflector 111 to reflect the image of the bar code X at scanning line X2. The electromagnet 116 works only 1/220 second each time it is energized, i.e. the electromagnet 116 is deenergized 1/220 second after being energized. When the electromagnet 116 is deenergized, it will be attracted again with the magnet 113, the reflector 111 will return to its former position as scanning line X1. This design could also save the power supply. If the bar code X can be recognized as the first reading, the angular position of the reflector 111 will not be changed. In case there is any reading error, the reflector 111 will be shifted between two position, scanning lines X1 and X2 alternatively.

Figure 5A:
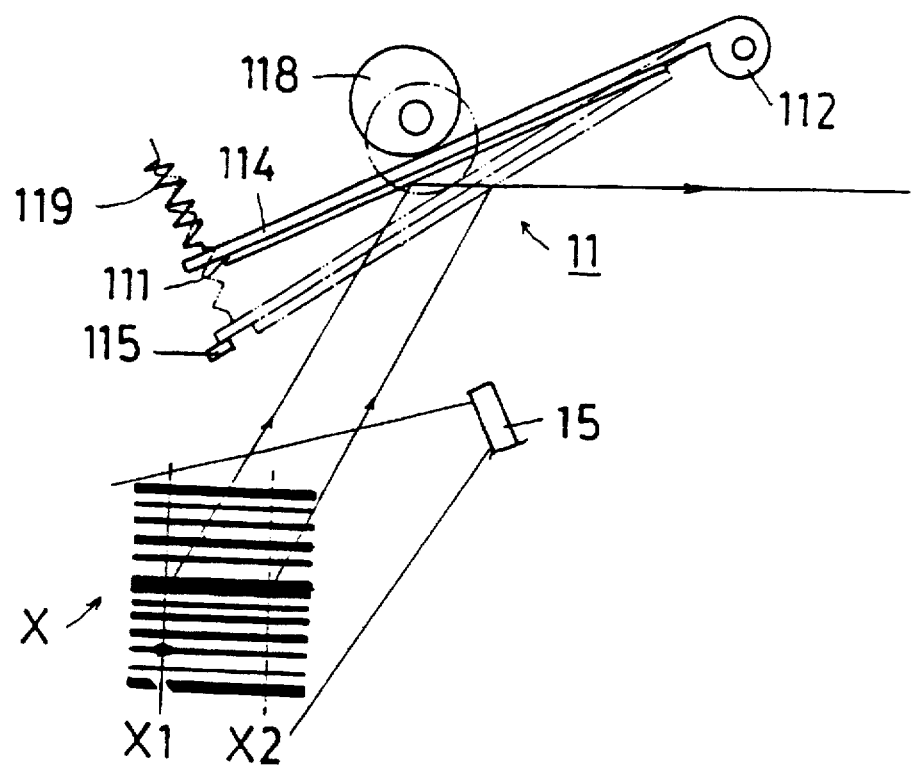
FIGS. 5A and 5B show an alternative of the reflector driving mechanism and its circuit according to the present invention.
Figure 5B:
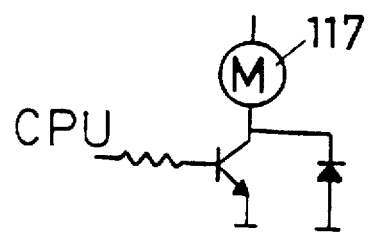

As an alternative form of the above mentioned invention as illustrated in the FIG. 5A and 5B, the position changes of the reflector 111 can be controlled by a motor, 117, through a cam, 118. The movable board 114 is tangent to the cam 118, having one end turned about the pivot 112, and an opposite end suspended from a spring, 119. When reading errors occur, the motor 117 is driven to turn the cam 118 to a pre-determined angle, which causes the cam to force the movable board 114 outwardly and therefore the reflector 111 is moved from a first position, scanning line X1, to a second position, scanning line X2.

Figure 6:
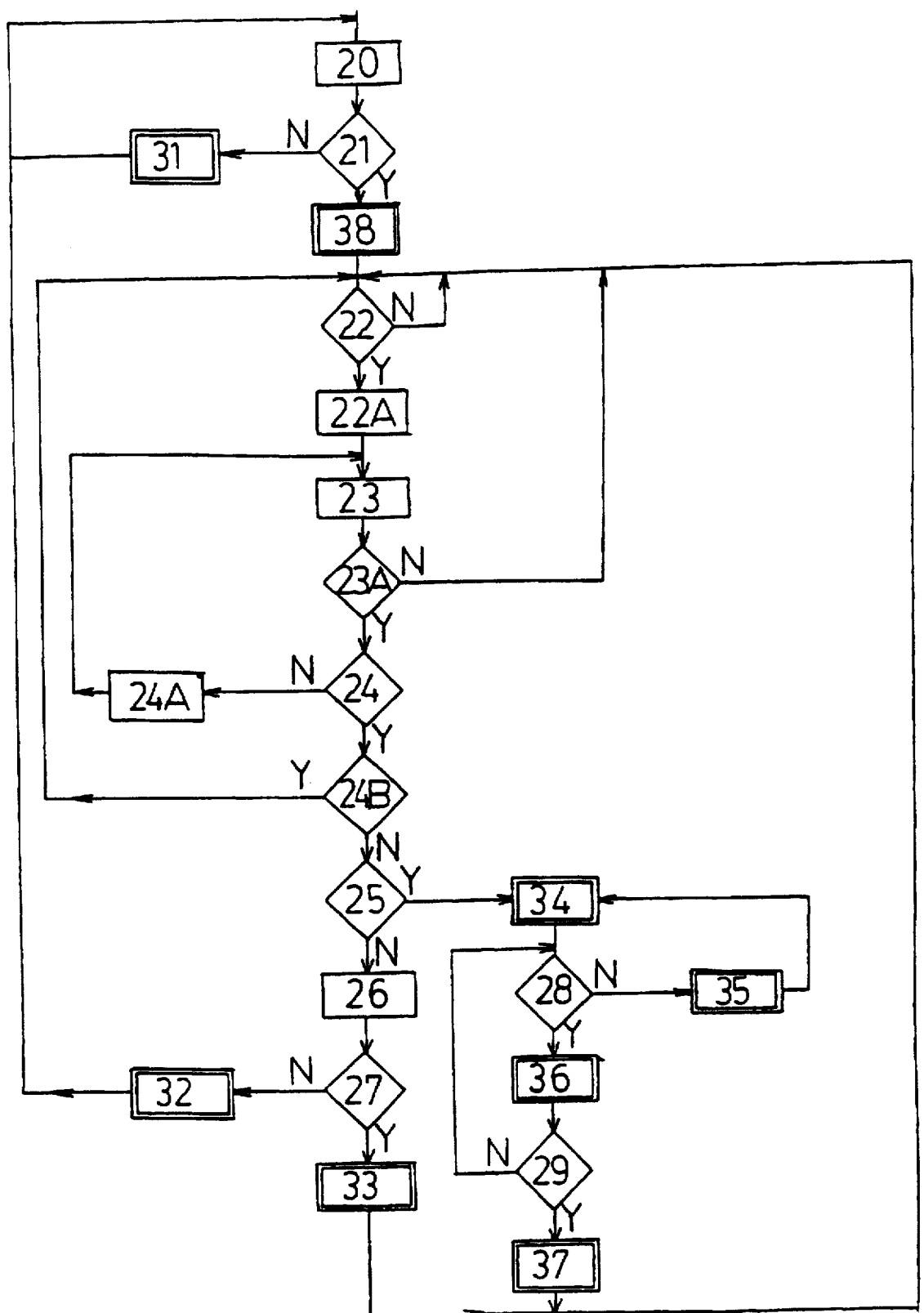
FIG. 6 is an operational flow chart according to the present inventions.

FIG. 6 is a flow chart showing the operation of the present inventions. When the operator holds the reader, power is on (step 20), and the reader automatically tests itself (step 21). If any error during self-test (step 21) is identified, an error signal is produced (step 31), and the reader can execute the reading operation only when the trouble is eliminated. If the reader tests normal, a correct signal is sent (step 38) and then a start signal is produced (step 22) to start the CCD array and the reader itself (step 22A). The reader then receives the bar code signal (step 23). If the bar code signal is recognized at the first reading, the reader stops a secondary bard code recognizing procedure (step 23A). After the recognition of the bar code signal, the recognized bar code signal is decoded (step 24), and then examined to eliminate a repeat reading of the antecedent bar code (step 24B). As a result, the decoded bar code signal is identified (step 25). If the bar code signal is not readable and cannot be decoded, the reader will start again (step 24A) and return to step 23 and the proceeding steps. If the decoded bar code is identified as a setting command (step 26), then a signal is produced to enter into the command (step 34). The command is designated as a command that can be either to set a new bar code or to release a set of codes. When the signal is identified as a normal bar code (step 26), it will be judged whether it is a designated bar code or not (step 27). If it is judged not to be a designated bar code, an error signal is outputted (step 32); or a correct signal is outputted (step 33) so as to complete the reading and calculating operations. When the decoded bar code signal is identified as a setting command, then a signal is produced to enter into the command (step 34), and it proceeds to step 28 to judge whether the bar code to be set is in conformity with the setting procedures (step 28). If the bar code to be set is not in compliance the setting procedures, and error signal is produced (step 35); if it is in compliance a correct signal is produced (step 36). Then it proceeds to step 29 to select whether the procedure is to be terminated or not. An end signal will be produced (step 37) if the setting is terminated.

It is to be understood that the drawings are designed for purposes of illustration only, and not intended as a definition of the limits and scope of the inventions disclosed.

What the invention claimed is:

1. A linear CCD hand held bar code reader comprising: a vibrator mounted and driven to vibrate when the reader completes reading a bar code; a sensor having a metal antenna around an area to be held by an operator, said metal antenna being induced by a capacitance of a reflector being mounted and shifted between a first and a second reflecting position to reflect an image of a bar code scanned at different scanning lines and driving mechanism installed to shift said reflector between said reflecting positions.

2. The linear CCD hand held bar code reader of claim 1 wherein said driving mechanism comprises a movable board secured to said reflector and turned about a pivot inside a housing, a baffle board, mounted to stop said movable board and said reflector in said first reflecting position; a magnet mounted on said movable board at one side opposing to said reflector, and an electromagnet mounted thereon facing said magnet; said electromagnet and said magnet being attracted together when said electromagnet is not energized, causing said movable board and said reflector to be retained in said first position; said electromagnet repelling said magnet when energized, causing said movable board and said reflector to be moved to said baffle board and stopped in said second reflecting position.

3. The linear CCD hand held bar code reader of claim 1 further comprising a cam, a motor to turn said cam, a movable board having one side at a tangent to said cam and an opposite side secured to said reflector, one end thereof turning about a pivot and an opposite end being suspended from a spring; said motor being driven to turn said cam through a pre-determined angle when an error reading occurs, whereby said cam forces said movable board and said reflector away from said first reflecting position to said second reflecting position.

* * * * *